United States Patent [19]

Kajimoto et al.

[11] Patent Number: 4,911,257
[45] Date of Patent: Mar. 27, 1990

[54] VEHICLE HAVING A SOLAR BATTERY SYSTEM

[75] Inventors: Shinshi Kajimoto; Tooru Niitani; Osamu Michihara; Mitsutoshi Kuroiwa, all of Hiroshima, Japan

[73] Assignee: Mazda Motor Corporation, Hiroshima, Japan

[21] Appl. No.: 271,282

[22] Filed: Nov. 15, 1988

[30] Foreign Application Priority Data

Nov. 20, 1987 [JP] Japan .................................. 62-294311

[51] Int. Cl.$^4$ ............................ B60L 1/00; B60H 1/22
[52] U.S. Cl. ....................................... 180/65.3; 98/2.01; 98/2.02; 98/2.18; 98/900; 136/291; 236/493; 320/30; 320/48; 320/61
[58] Field of Search ................ 136/291, 293; 180/65.3; 98/2.01, 2.02, 2.18, 900; 236/49.3; 320/30, 48, 61

[56] References Cited

U.S. PATENT DOCUMENTS

| | | |
|---|---|---|
| 4,497,240 | 2/1985 | Nagatomo et al. .................. 98/2.01 |
| 4,633,767 | 1/1987 | Sain ............................................ 98/6 |
| 4,804,140 | 2/1989 | Cantrell .................................. 236/49 |

FOREIGN PATENT DOCUMENTS

| | | | |
|---|---|---|---|
| 59-53915 | 5/1977 | Japan | .................. 98/2.01 |
| 58-139812 | 8/1983 | Japan | .................. 98/2.01 |
| 61-196815 | 9/1986 | Japan | .................. 98/2.02 |
| 61-200021 | 9/1986 | Japan | .................. 98/2.18 |

Primary Examiner—Aaron Weisstuch
Attorney, Agent, or Firm—Sixbey, Friedman, Leedom and Ferguson

[57] ABSTRACT

A solar battery system for a vehicle comprises a solar battery mounted on a body of the vehicle, an actinometer provided on the body for detecting the quantity of solar radiation supplied to the body, a controller for comparing an output of the solar battery with a detection output of the actinometer to obtain a result of comparison and generating an alarm signal when the result of comparison is out of a predetermined condition, and a warning device provided in a cabin formed in the vehicle for giving a warning in response to the alarm signal obtained from the controller.

18 Claims, 4 Drawing Sheets

VEHICLE HAVING A SOLAR BATTERY SYSTEM

BACKGROUND OF THE INVENTION

1. Field of the Invention

The present invention relates generally to solar battery systems for vehicles, and more particularly, to a system for supplying electrical equipment of a vehicle with electric power produced by a solar battery, in which the solar battery is mounted on a vehicle body and the function of the solar battery as a power source is monitored in the cabin of the vehicle.

2. Description of the Prior Art

When a vehicle with a closed cabin, such as a passenger car, is parked for hours to be exposed to the scorching heat of the sun, the temperature in the cabin may be extremely increased compared with the atmospheric temperature outside of the vehicle. In a condition in which the temperature in the cabin has risen to be so high, a driver or passenger getting in the vehicle feels uncomfortable and it takes a long time to reduce the temperature in the cabin to be agreeable after an air conditioner of the vehicle is started to operate.

For the purpose of relieving such inconveniences, there has been proposed to provide a vehicle with a ventilation arrangement which includes ventilation ducts formed in a vehicle body to cause the cabin of the vehicle body to communicate with the outside of the vehicle and ventilating fans disposed in the ventilation ducts, respectively, wherein each ventilating fan is caused to operate for exhausting air from within the cabin to the outside of the vehicle and taking fresh air into the cabin. The effect is to reduce the temperature in the cabin when a difference between the temperature in the cabin and the atmospheric temperature outside of the vehicle reaches a predetermined value. In such a ventilation arrangement, however, since the ventilating fans are usually driven by electric power supplied from a storage battery employed in the vehicle, it is feared that the storage battery is subject to an excessive load to drive the ventilating fans in a parked vehicle without being charged.

Accordingly, it has been also proposed to use, in place of a storage battery, a solar battery which is operative to directly convert solar energy to electric energy in order to supply electric power for driving ventilating fans provided in such a ventilation arrangement as mentioned above, as disclosed in, for example, the Japanese examined patent specification No. 59-51451. In this case, the solar battery is mounted on a roof of a vehicle body to have a plurality of light receiving areas covered by a glass plate and facing upward to the outside of the vehicle body so as to receive the sunlight effectively, wherein the electric power obtained i response to the quantity of solar radiation from the solar battery is applied to each of the ventilating fans to drive the same.

In the case of the solar battery, when the light receiving areas cannot receive the sunlight properly due to some shading substance attached to the glass plate covering the light receiving areas or breakages of the glass plate, or the light receiving areas get out of order substantially, the solar battery malfunctions so as not to properly produce electric power in response to the quantity of the solar radiation. If the malfunction of the solar battery is not detected by the driver or passenger and the malfunctioning solar battery continues to apply electric power to each of the ventilating fans to drive the same, the solar battery is not used effectively or is unable to supply the electric power required for driving the ventilating fans. In a situation wherein the malfunctioning solar battery is used as a power source for the ventilating fans without being noticed by the driver or passenger, as mentioned above, the result is either that the ventilation arrangement cannot operate effectively, or the storage battery provided in addition to the solar battery needs to continue supplying the ventilating fans with sufficient electric power for driving the same, and thereby is subjected to the danger of excessive discharge.

OBJECTS AND SUMMARY OF THE INVENTION

It is an object of the present invention to provide a solar battery system for a vehicle in which a solar battery is used selectively as a power source for supplying electric equipment that is provided in the vehicle with electric power, which avoids the aforementioned problems and disadvantages encountered with the prior art.

Another object of the present invention is to provide a solar battery system for a vehicle in which a solar battery is used selectively as a power source for supplying electric equipment in the vehicle with electric power, wherein a malfunction of the solar battery can be easily or surely noticed by a driver or passenger within the vehicle when the solar battery has malfunctioned so as not to properly produce electric power.

A further object of the present invention is to provide a solar battery system for a vehicle in which a solar battery is used selectively as a power source for supplying electric equipment in the vehicle with electric power and a malfunction of the solar battery is detected and monitored in the vehicle cabin.

According to the present invention, there is provide a solar battery system for a vehicle, which comprises a solar battery mounted on the body of the vehicle, an actinometer provided on the vehicle body for detecting the quantity of solar radiation supplied to the vehicle body, and a controller for comparing an output of the solar battery with a detection output of the actinometer to obtain a comparison result and to generate an alarm signal when the comparison result is out of a predetermined condition. Additionally, a warning device is provided in the vehicle cabin for giving a warning in response to the alarm signal obtained from the controller.

In the system thus constituted in accordance with the present invention, a malfunction of the solar battery is detected in response to the fact that the comparison result between the output of the solar battery and the detection output of the actinometer is out of the predetermined condition and the warning device is operative to warn a driver or passenger in the vehicle cabin of the malfunction of the solar battery. Accordingly, the malfunction of the solar battery can be easily noticed by the driver or passenger, and therefore, when the solar battery is in a malfunctioning condition, the solar battery can be prevented from being used as a power source for electrical equipment in the vehicle. Then, this results in that the electrical equipment in the vehicle are supplied with electric power from the solar batter when the solar battery can efficiently serve the electrical equipment with the output thereof.

The above, and other objects, features and advantages of the present invention will become apparent from the following detailed description which is to be read in conjunction with the accompanying drawings.

DESCRIPTION OF THE PREFERRED EMBODIMENTS

The invention will now be described by way of example with reference to the accompanying drawings.

Figure 1:
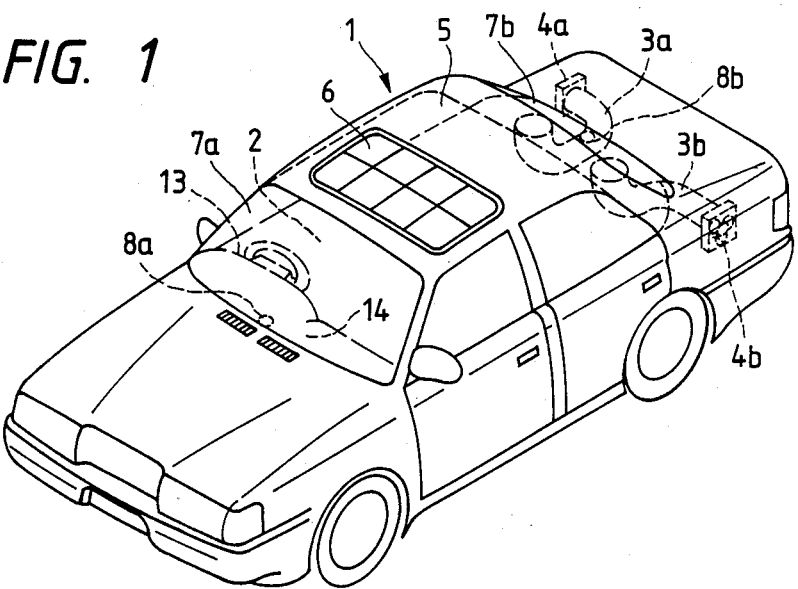
FIG. 1 is a schematic perspective view showing an example of a vehicle to which one embodiment of solar battery system for a vehicle according to the present invention is applied.

Referring to FIG. 1, one embodiment of solar battery system for a vehicle according to the present invention is applied to a vehicle having a body 1. The body 1 is provided with a cabin 2 formed therein and ventilation ducts 3a and 3b formed in its rear portion to cause the cabin 2 to communicate with the outside of the body 1. Ventilating fans 4a and 4b are disposed in the ventilation ducts 3a and 3b, respectively. When the ventilating fan 4a is driven to operate, fresh air is taken in the cabin 2 through the ventilation duct 3a from the outside, and when the ventilating fan 4b is driven to operate, air present in the cabin 2 is exhausted to the outside via the ventilation duct 3b from the cabin 2.

The body 1 is also provided on a roof 5 thereof with a solar battery 6 which is to be used, as occasion demands, as a power source for supplying the ventilating fans 4a and 4b with electric power. The solar battery 6 is mounted on the roof 5 and has a plurality of light receiving areas covered by a transparent protective plate and facing upward to the outside of the body 1 so as to receive the sunlight effectively and produce an output of electric power proportional to the quantity of solar radiation supplied to the body 1 under a condition of normal function. The output of electric power of the solar battery 6 is represented by the product of the output voltage and the output current of the solar battery 6.

Figure 2:
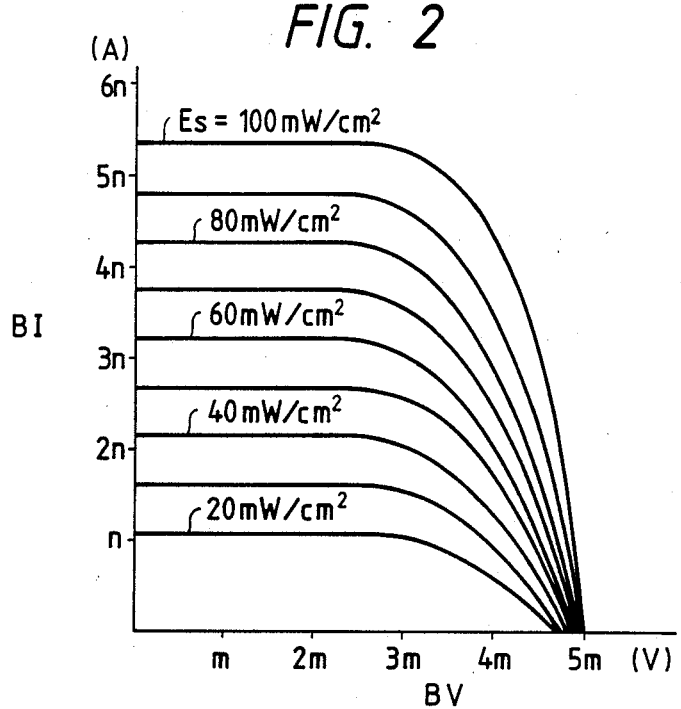
FIG. 2 is a graphic diagram used for explanation of a solar battery employed in the embodiment applied to the vehicle shown in FIG. 1.

One example of an output characteristic of the solar battery 6 is shown in the graphic diagram of FIG. 2 with the abscissa representing the output voltage (BV) of the solar battery 6 and the ordinate representing the output current (BI) of the solar battery 6. In the graphic diagram of FIG. 2, m and n are positive constants respectively, and each of the curves shows the relation between the output voltage BV and output current BI under the condition wherein the quantity of solar radiation (Es) supplied to the body 1 is 20 mW/cm$^2$, 40 mW/cm$^2$, 60 mW/cm$^2$, 80 mW/cm$^2$ or 100 mW/cm$^2$. As may be understood from the output characteristic shown in FIG. 2, the maximum value of the output voltage BV is kept almost constant regardless of the quantity of solar radiation Es supplied to the body 1 and the output current BI under the condition of a certain constant output voltage BV varies substantially in proportion to variations in the quantity of solar radiation Es supplied to the body 1. A major part of electric power obtained from the solar battery 6 is supplied to each of the ventilating fans 4a and 4b to drive the same.

Figure 3:
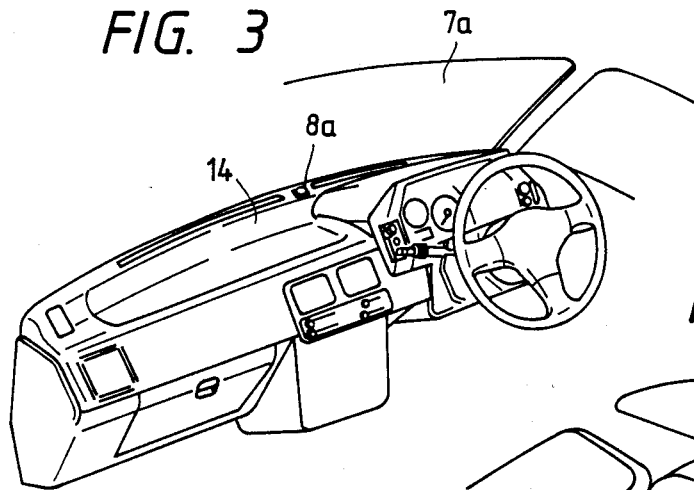
FIG. 3 is a schematic illustration showing a front portion of a cabin formed in the vehicle shown in FIG. 1.
Figure 4:
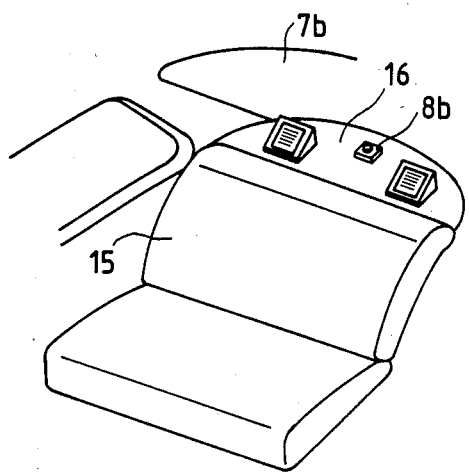
FIG. 4 is a schematic illustration showing a rear portion of a cabin formed in the vehicle shown in FIG. 1.

In the body 1, a front actinometer 8a is disposed on an instrument panel 14 provided in a front portion of the cabin 2 positioned in the vicinity of the lower portion of the front windshield 7a, as shown clearly in FIG. 3, and a rear actinometer 8b is disposed on a rear shelf panel 16 provided behind a rear seat 15 in a rear portion of the cabin 2 positioned in the vicinity of the lower portion of the rear windshield 7b, as shown in FIG. 4. The front and rear actinometers 8a and 8b have the same characteristic, and each of the front and rear actinometers 8a and 8b is operative to detect the quantity of solar radiation received by the body 1 and produce a detection output in the form of an output current thereof which is proportional to the detected quantity of solar radiation.

Figure 5:
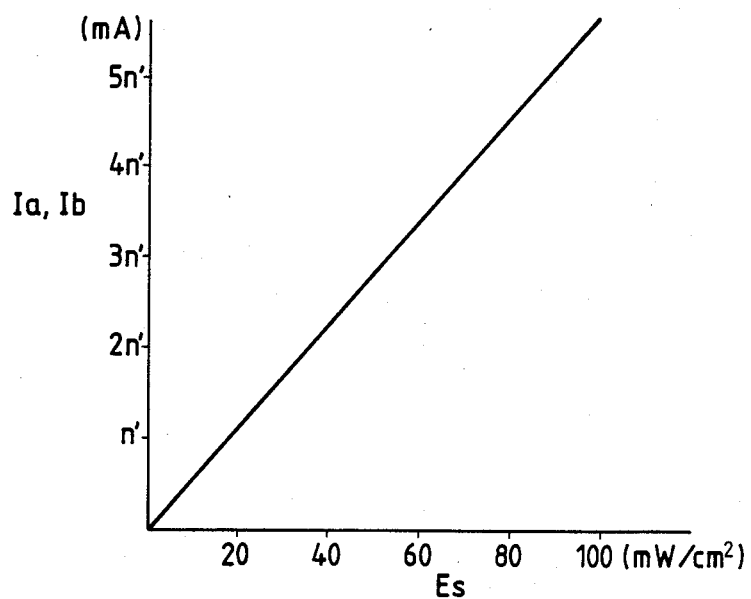
FIG. 5 is a graph diagram used for explanation of actinometers employed in the embodiment applied to the vehicle shown in FIG. 1.

One example of an output characteristic of the front or rear actinometer 8a or 8b is shown in the graphic diagram of FIG. 5 in which the abscissa represents the quantity of solar radiation (Es) supplied to the body 1, the ordinate represents the output current (Ia) of the front actinometer 8a or the output current (Ib) of the rear actinometer 8b, and n' is a positive constant. As may be understood from the output characteristic shown in FIG. 5, each of the output current Ia and the output current Ib varies in proportion to variations in the quantity of solar radiation Es supplied to the body 1.

Figure 6:
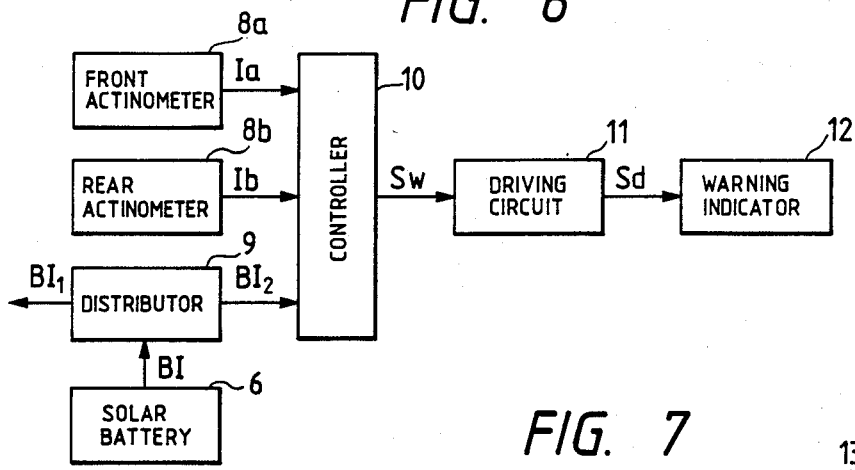
FIG. 6 is a schematic block diagram of the embodiment applied to the vehicle shown in FIG. 1.

FIG. 6 shows the embodiment applied to the vehicle shown in FIG. 1 to include the solar battery 6 and the front and rear actinometers 8a and 8b, as described above, in the form of a block diagram. This embodiment is provided with a controller 10 to which the output current Ia from the front actinometer 8a and the output current Ib from the rear actinometer 8b are supplied. Further, a distributor 9 is provided for dividing the output current BI of the solar battery 6 into a pair of solar battery currents BI$_1$ and BI$_2$ each being proportional to the output current BI. The solar battery current BI$_1$ obtained from the distributor 9 is supplied as the output of the solar battery 6 to each of the ventilating fans 4a and 4b, and the solar battery current BI$_2$ obtained from the distributor 9 is supplied to the controller 10.

A warning indicator 12 is connected through a driving circuit 11 to the controller 10. The driving circuit 11 is supplied with an alarm signal Sw which is obtained from the controller 10 in such a manner as described later and produces a driving signal Sd based on the alarm signal Sw. The driving signal Sd is supplied to the warning indicator 12 to cause the same to operate. Consequently, the warning indicator 12 operates substantially to give a warning in response to the alarm signal Sw sent from the controller 10.

Figure 7:
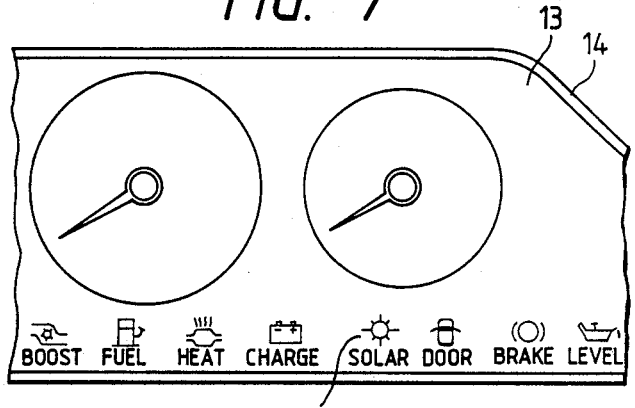
FIG. 7 is a schematic illustration used for explaining a warning indicator employed in the embodiment applied to the vehicle shown in FIG. 1.

The distributor 9, controller 10 and driving circuit 11 as mentioned above are contained in an electric circuit box (not shown in the drawings) which is disposed, for example, at a predetermined portion in the cabin 2. The warning indicator 2 is constituted by, for example, a warning lamp (12) provided, together with various other indicators, on a dashboard 13 which is incorporated with the instrument panel 14 disposed in the front portion of the cabin 2, as shown in FIG. 7.

In the vehicle equipped with the embodiment constituted as mentioned above, when a temperature sensor provided in a predetermined position in the cabin 2 detects that the temperature in the cabin 2 has risen to be equal to or greater than a predetermined value in a situation wherein the vehicle is parked to be exposed to the scorching heat of the sun, the solar battery current $BI_1$ divided by the distributor 9 from the output current BI of the solar battery 6 to which the sunlight is applied is commenced to be supplied to each of the ventilating fans 4a and 4b to drive the same so that the cabin 2 is ventilated through the ventilation ducts 3a and 3b. Under such a condition, the solar battery current $BI_2$, the output current Ia from the front actinometer 8a and the output current Ib from the rear actinometer 8b are supplied to the controller 10. Since the solar battery 6 and each of the front and rear actinometers 8a and 8b have the respective output characteristics as shown in the graphic diagrams of FIGS. 2 and 5, respectively, in the case where the front and rear actinometers 8a and 8b are kept in the sun in the same manner as the solar battery 6, the output current Ia or Ib of each of the front and rear actinometers 8a and 8b has such a value as to satisfy a predetermined ratio to the output current BI obtained from the solar battery 6 functioning normally and thereby to satisfy also another predetermined ratio to the solar battery current $BI_2$ obtained from the distributor 9. The front actinometer 8a is disposed in the front portion of the cabin 2 and the rear actinometer 8b is disposed in the rear portion of the cabin 2, and therefore it is very likely that at least one of the front and rear actinometers 8a and 8b will be kept in the sun in the same manner as the solar battery 6.

Thus, under the above conditions, when both the front and rear actinometers 8a and 8b are in the sun in the same manner as the solar battery 6, the output current Ia from the front actinometer 8a is equal to the output current Ib from the rear actinometer 8b. When the front actinometer 8a is in the sun in the same manner as the solar battery 6 but the rear actinometer 8b does not receive plentiful sunlight, the output current Ia is larger than the output current Ib. In the same manner, when the rear actinometer 8b is in the sun with the solar battery 6 but the front actinometer 8a does not receive plentiful sunlight, the output current Ib is larger than the output current Ia.

The controller 10, to which the solar battery current $BI_2$, the output current Ia from the front actinometer 8a and the output current Ib from the rear actinometer 8b are supplied, is operative to compare the output currents Ia and Ib to each other. The controller 10 then selects either one of the output currents Ia and Ib when the output currents Ia and Ib are equal to each other or selects the larger one of the output currents Ia and Ib when the output currents Ia and Ib are different from each other. After that, the controller 10 is further operative to obtain a ratio of the selected output current Ia or Ib to the solar battery current $BI_2$. Then, it is judged by the controller 10 that the solar battery 6 is functioning normally when the ratio of the selected output current Ia or Ib to the solar battery current $BI_2$ is equal to or larger than a predetermined value. Otherwise, it is judged by the controller 10 that the solar battery 6 is undesirably malfunctioning and cannot properly produce the output of electric power needed. Such malfunctioning may possibly be due to some shading substance attached to the transparent protective plate covering the light receiving areas of the solar battery 6, breakage of the transparent protective plate, or some trouble arising in the light receiving areas of the solar battery 6. As a result, the alarm signal Sw is supplied to the driving circuit 11 from the controller 10 when the ratio of the selected output current Ia or Ib to the solar battery current $BI_2$ is smaller than the predetermined value. In the case where the alarm signal Sw is supplied to the driving circuit 11 from the controller 10, the warning indicator 12 is driven by the driving circuit 11 to turn on the warning lamp (12) provided on the dashboard 13 for giving a warning.

With the warning given by the warning indicator 12 in response to the alarm signal Sw, the malfunction of the solar battery 6 can be easily noticed by a driver or passenger in the vehicle, and therefore, when the solar battery 6 is in a malfunctioning state, the solar battery 6 is prevented from being used as a power source for the ventilating fans 4a and 4b without being noticed of the malfunction thereof. Consequently, the ventilating fan 4a and 4b are supplied with the electric power from the solar battery 6 when the solar battery 6 can efficiently serve the ventilating fans 4a and 4b with the output of electric power thereof.

The controller 10 which is operative to control the operation of the warning indicator 12 in such a manner as mentioned above may be constituted by a microcomputer. In such a case, an operation program of the microcomputer constituting the controller 10 for conducting the control for the warning indicator 12 is carried out in accordance with a flow chart shown in FIG. 8.

Figure 8:
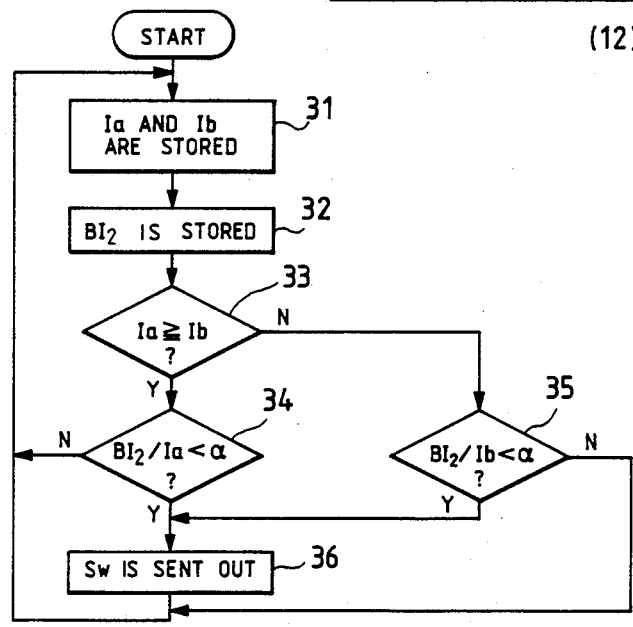
FIG. 8 is a flow chart showing an example of an operation program for a control performed by a microcomputer which is used in a controller employed in the embodiment applied to the vehicle shown in FIG. 1.

According to the flow chart shown in FIG. 8, first, in process step 31, the value of the output current Ia from the front actinometer 8a and the value of the output current Ib from the rear/ actinometer 8b are stored. Next, in process step 32, the value of the solar battery current $BI_2$ from the distributor 9 is also stored. Then, in decision step 33, it is checked based on the values stored in the process step 31 whether the output current Ia is equal to or larger than the output current Ib or not.

When it is determined in the decision step 33 that the output current Ia is equal to or larger than the output current Ib, it is checked in decision step 34 based on the values stored respectively in the process steps 31 and 32, whether the ratio of the solar battery current $BI_2$ to the output current Ia is smaller than a predetermined value $\alpha$ or not. If the ratio of the solar battery current $BI_2$ to the output current Ia is not smaller than the predetermined value $\alpha$, the program returns to the process step 31 to repeat the operations mentioned above. However, if the ratio of the solar battery current $BI_2$ to the output current Ia is smaller than the predetermined value $\alpha$, the program advances to process step 36.

On the other hand, when it is determined in the decision step 33 that the output current Ia is smaller than the output current Ib, it is checked in decision step 35, based on the values stored respectively in the process steps 31 and 32, whether the ratio of the solar battery current $BI_2$ to the output current Ib is smaller than the predetermined value $\alpha$ or not. If the ratio of the solar battery current $BI_2$ to the output current $Ib$ is not smaller than the predetermined value $a$, the program returns to the process step 31 to repeat the operations mentioned above. However, if the ratio of the solar battery current $BI_2$ to the output current $Ib$ is smaller than the predetermined value $a$, the program advances to the process step 36.

Then, in the process step 36, the alarm signal $Sw$ is sent out to the driving circuit 11. After that, the program returns to the process step 31 to repeat the operation therein and the operations in the following processes and decisions successively.

Figure 9:
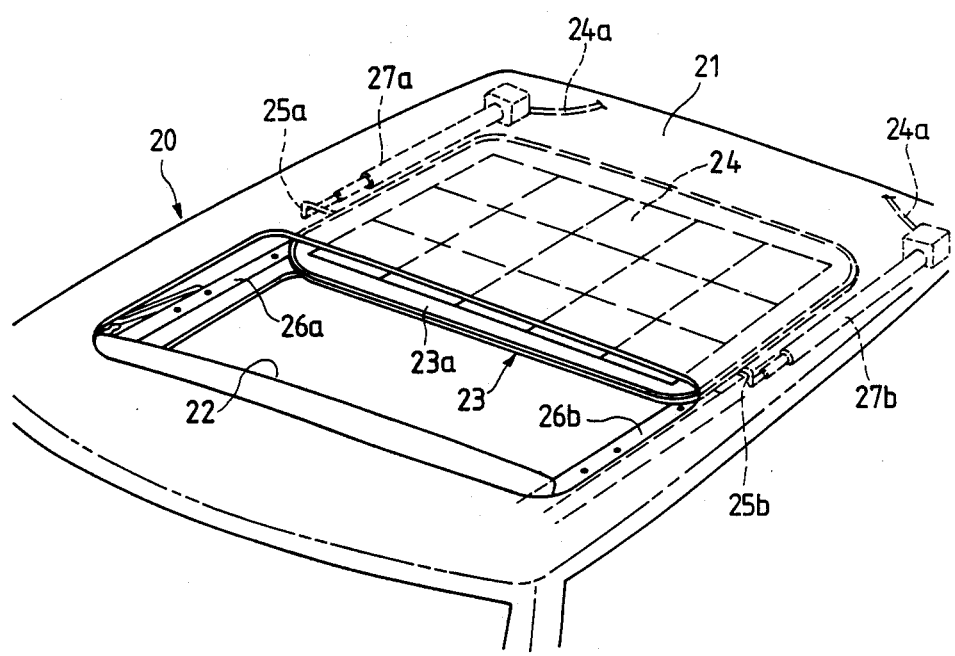
FIG. 9 is a schematic perspective view showing a part of an example of a vehicle to which another embodiment of solar battery system for a vehicle according to the present invention is applied.

FIG. 9 shows a part of a vehicle to which another embodiment of solar battery system for a vehicle according to the present invention is applied.

The embodiment applied to the vehicle having the part thereof shown in FIG. 9 has a solar battery 24 which is fixed to a slidable sun roof panel 23 so as to be mounted on a roof 21 of the body 20 of the vehicle and includes other elements and parts (omitted to be shown in the drawings) constructed in the same manner as those of the embodiment applied to the vehicle shown in FIG. 1 and described above.

The slidable sun roof panel 23 comprises a transparent glass plate 23a and the solar battery 24 is attached to the slidable sun roof panel 23 so that a plurality of light receiving areas of the solar battery 24 are covered by the transparent glass plate 23a. Further, the slidable sun roof panel 23 is provided with a pair of engaging members 25a and 25b which project from the right and left sides of the slidable sun roof panel 23, respectively.

The roof 21 of the body 20 is provided with an opening 22 for communicating the cabin formed in the body 20 with the outside of the body 20. Under the roof 21 of the cabin, a pair of guide rail members 26a and 26b, each of which extends in a direction of the length of the vehicle, are provided at the right and left marginal portion of the roof 21, and a pair of telescopic pipe members 27a and 27b are also provided to be contiguous to and extend along the guide rail members 26a and 26b, respectively.

The slidable sun roof panel 23 on which the solar battery 24 is attached s disposed under the roof 21 with the right edge portion between the right marginal portion of the roof 21 and the guide rail member 26a and the left edge portion between the left marginal portion of the roof 21 and the guide rail member 26b supported by the guide rail members 26a and 26b.

The engaging members 25a and 25b which project from the slidable sun roof panel 23 supported by the guide rail members 26a and 26b are connected with end portions of the telescopic pipe members 27a and 27b, respectively, so that the slidable sun roof panel 23 moves in the direction of the length of the vehicle along the guide rail members 26a and 26b when the telescopic pipe members 27a and 27b are expanded or contracted in synchronism with each other. Then, the slidable sun roof panel 23 is so disposed as to close the opening 22 provided on the roof 21 after its movement toward a front end portion of the roof 21 and stored under the roof 21 to keep the opening 22 open after its movement toward a rear end portion of the roof 21.

Lead wires 24a extending from the solar battery 24 pass through the telescopic pipes 27a and 27b to be guided into the body 20.

In the embodiment provided with the solar battery 24 as shown in FIG. 9, the solar battery 24 is positioned to be able to receive the sunlight when the slidable sun roof panel 23 i disposed to shut the opening 22 and shaded not to receive the sunlight when the slidable sun roof panel 23 is stored under the roof 21 to keep the opening 22 open. Accordingly, the embodiment provided with the solar battery 24 as shown in FIG. 9 is operative to supply ventilating fans, such as the ventilating fans 4a and 4b shown in FIG. 1, with electric power and give a warning of a malfunction of the solar battery 24 under a predetermined condition in the same manner as the embodiment applied to the vehicle shown in FIG. 1 when the slidable sun roof panel 23 is disposed to close the opening 22, and, o the other hand, is kept inoperative when the slidable sun roof panel 23 is stored under the roof 21 to keep the opening 22 open.

Although the warning indicator 12 is constituted by the warning lamp (12) in the embodiments described above, it is understood that various different warning devices other than the warning lamp can be used for constituting the warning indicator 12. Further, although the front and rear actinometers 8a and 8b are used in the embodiments described above, it is also understood that the system according to the present invention is not limited thereto, and that a single actinometer or actinometers more than three can be used for detecting the quantity of solar radiation supplied to a vehicle body in the system according to the present invention.

What is claimed is:

1. A vehicle having a solar battery system comprising:
    a solar battery mounted on a body of the vehicle,
    actinometer means for detecting the quantity of solar radiation supplied to the body of the vehicle,
    control means operative to compare an output of said solar battery with a detection output of said actinometer means to obtain a result of comparison and generate an alarm signal when the result of comparison obtained is out of a predetermined condition, and
    warning means provided in the vehicle cabin for giving a warning in response to the alarm signal obtained from said controller.

2. A vehicle according to claim 1, wherein said actinometer means is positioned close to a lower portion of a front windshield of the vehicle.

3. A vehicle according to claim 1, wherein said actinometer means is disposed on an instrument panel provided in a front portion of the cabin.

4. A vehicle according to claim 1, wherein said actinometer means is positioned close to a lower portion of a rear windshield of the vehicle.

5. A vehicle according to claim 4, wherein said actinometer means is disposed on a rear shelf panel provided in a rear portion of the cabin.

6. A vehicle according to claim 1, wherein said actinometer means comprises a plurality of actinometers disposed at different portions of the vehicle.

7. A vehicle according to claim 6, wherein said control means is operative to compare the output of said solar battery with the maximum one of the detection outputs of said plurality of actinometers to obtain the result of said comparison.

8. A vehicle according to claim 6, wherein at least two of said actinometers are disposed in front and rear portions of the cabin, respectively.

9. A vehicle according to claim 8, wherein said control means is operative to compare the output of said solar battery with the maximum one of the detection outputs of said actinometers disposed in the front and rear portions of the cabin to obtain the result of comparison.

10. A vehicle according to claim 8, wherein said two of said actinometers are disposed on an instrument panel provided in the front portion of the cabin and on a rear shelf panel provided in the rear portion of the cabin, respectively.

11. A vehicle according to claim 1, wherein said solar battery is disposed on a roof portion of the body of the vehicle.

12. A vehicle according to claim 11, wherein said actinometer means comprises a plurality of actinometers and at least two of said actinometers are disposed in front and rear portions of the cabin, respectively.

13. A vehicle according to claim 12, wherein said control means is operative to compare the output of said solar battery attached to the roof portion of the body of the vehicle with the maximum one of the detection outputs of the actinometers disposed in the front and rear portions of the cabin to obtain the result of comparison.

14. A vehicle according to claim 13, wherein said two of said actinometers are disposed on an instrument panel provided in the front portion of the cabin and on a rear shelf panel provided in the rear portion of the cabin, respectively.

15. A vehicle according to claim 11, wherein said solar battery is attached to a slidable sun roof panel provided on the roof portion of the body of the vehicle.

16. A vehicle according to claim 11, wherein the roof portion of the body of the vehicle is provided with an opening and said slidable sun roof panel is disposed selectively to shut the opening so as to position said solar battery to be able to receive the sunlight and to be stored under the roof portion so as to cause said solar battery to be shaded so as not to receive the sunlight.

17. A vehicle according to claim 1, wherein said warning means is operative to give a visual warning in response to the alarm signal.

18. A vehicle according to claim 17, wherein said warning means comprises a warning lamp provided on a dashboard disposed in a front portion of the cabin.

* * * * *